United States Patent
Lin et al.

(10) Patent No.: US 10,966,249 B2
(45) Date of Patent: Mar. 30, 2021

(54) DISTRIBUTED RESOURCE ALLOCATION FOR DEVICES

(71) Applicant: Taiwan Semiconductor Manufacturing Company, Ltd., Hsin-Chu (TW)

(72) Inventors: Hsuan-Li Lin, Hsinchu (TW); Ching-Yao Huang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 33 days.

(21) Appl. No.: 16/220,112

(22) Filed: Dec. 14, 2018

(65) Prior Publication Data

US 2019/0132877 A1  May 2, 2019

Related U.S. Application Data

(63) Continuation of application No. 14/808,222, filed on Jul. 24, 2015, now Pat. No. 10,165,465.

(51) Int. Cl.
*H04W 74/08* (2009.01)
*H04W 74/02* (2009.01)

(52) U.S. Cl.
CPC ........ *H04W 74/0816* (2013.01); *H04W 74/02* (2013.01)

(58) Field of Classification Search
CPC .................. H04W 74/0816; H04W 74/02
See application file for complete search history.

(56) References Cited

U.S. PATENT DOCUMENTS

2008/0311942 A1  12/2008  Kim et al.
2011/0141959 A1*  6/2011  Damnjanovic et al. .................. H04L 1/1854
                                                                    370/311
2016/0270123 A1  9/2016  Wang

OTHER PUBLICATIONS

S. Liew, Physical-layer network coding: Tutorial, survey, and beyond, Physical Communication 6, 2003.*
Wu, et al., "FlashLinQ, A Synchronous Distributed Scheduler for Peer-to-Peer Ad Hoc Networks," Transactions on Networkingm, 2013, pp. 1215-1228, vol. 21, Issue 4, IEEE, 14 pages.
Yunnan Wu, "Network Coding for Wireless Networks," Microsoft Report, MSR-TR-2007-90, 2007.

* cited by examiner

*Primary Examiner* — Zhensheng Zhang
(74) *Attorney, Agent, or Firm* — Haynes and Boone, LLP

(57) ABSTRACT

Distributed resource allocation for devices can be facilitated via a priority sequencing scheme. The priority sequencing scheme can mitigate source device collisions by assigning priority values to source devices and channels associated with the source devices. Various priority sequencing can be used based upon whether source devices can only communicate with a limited number of sink devices or whether source devices can communicate with all sink devices.

20 Claims, 12 Drawing Sheets

Response Phase
Sink-1: send C(A+B+C)
Sink-2: send C(A+B+C)
Sink-3: send C(A+B+C)
Source-A: get C(A+B+C)
Source-B: get C(A+B+C)
Source-C: get C(A+B+C)

Number of data channel:
Two channel: $a$ & $b$
Sequence priority:
C(A)>C(B)>C(C)>C(D)

Response Phase
Sink-1: send C(A+B+C)
Sink-2: send C(A+B+C)
Sink-3: send C(A+B+C)
Source-A: get C(A+B+C)
Source-B: get C(A+B+C)
Source-C: get C(A+B+C)

Number of data channel:
Two channel: $a$ & $b$
Sequence priority:
C(A)>C(B)>C(C)>C(D)

Bandwidth Request Phase
Source-A: send BW-A@a
Source-B: send BW-B@b
Source-C: silent
Sink-1: get BW-A&B
Sink-2: get BW-A&B
Sink-3: get BW-A&B

Number of data channel:
Two channel: $a$ & $b$
Sequence priority:
C(A)>C(B)>C(C)>C(D)

Resource Allocation Phase
Sink-1: send SA
Sink-2: send SA
Sink-3: send SA
Source-A: get SA
Source-B: get SA
Source-C: get SA

Number of data channel:
Two channel: $a$ & $b$
Sequence priority:
C(A)>C(B)>C(C)>C(D)

DISTRIBUTED RESOURCE ALLOCATION FOR DEVICES

This is a continuation application of U.S. patent application Ser. No. 14/808,222, filed Jul. 24, 2015, now U.S. Pat. No. 10,165,465, the entire disclosure of which is hereby incorporated by reference.

TECHNICAL FIELD

This disclosure relates generally to device-to-device (D2D) resource allocation based on a resource allocation scheme with priority sequencing.

BACKGROUND

D2D communication is a low-power capacity enhancement technique, which can improve spectrum efficiency and also offload traffic from a macro-eNB network. D2D communication can provide enhanced system capacity with low power for ubiquitous broadband wireless applications. Although D2D communication can take place without the assistance of a macro-eNB, D2D devices and existing macro cell systems can concurrently reuse an available spectrum.

Aggregated interference from multiple D2D communication pairs can interfere with the macro-user equipment (UE) signals. When femtocells adaptively allocate channels and transmission power for femto-UEs, different D2D devices can experience various femto-to-device interference strength. Furthermore, the femto-to-device interference strength can also be time varying. Within a macro/femto/D2D heterogeneous network, the information from eNB to D2D devices can be limited, which can reduce resource allocation and interference mitigation.

The aforementioned presents challenges in resource allocation for macro/femto/D2D heterogeneous networks because the information from eNB to D2D devices can be limited causing collisions between devices. However, a distributed resource allocation scheme with priority sequencing can mitigate the collisions between devices and further allocate a variable size of a radio resource and achieve joint resource allocation.

The above-described background relating to D2D communications is merely intended to provide a contextual overview of some current issues, and is not intended to be exhaustive. Other contextual information may become further apparent upon review of the following detailed description.

SUMMARY

A simplified summary is provided herein to help enable a basic or general understanding of various aspects of non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one embodiment, described herein is a method for a priority-sequencing scheme can be achieved via a transmission request phase, a response phase, and a data transmission phase. The D2D communication can take place over two separate channels where one channel has a higher priority sequencing than the other.

According to another embodiment, described herein is a system for facilitating signal data transmissions via a data channel. Signals can be sent from the source devices to the sink devices and other signals can be sent from the sink devices to the source devices.

Additionally, according to a further embodiment, described herein is a system that can facilitate a priority-sequencing scheme via a transmission request phase, a response phase, a bandwidth request phase, and a resource allocation phase. The D2D communication allows each sink to hear every source using a two-channel priority-sequencing scheme.

It is to be understood that both the foregoing general description and the following detailed description are exemplary and explanatory only and are not restrictive. Therefore, the disclosed subject matter should not be limited to any single embodiment, or group of embodiments described herein, but rather should be construed in breadth and scope in accordance with the appended claims.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
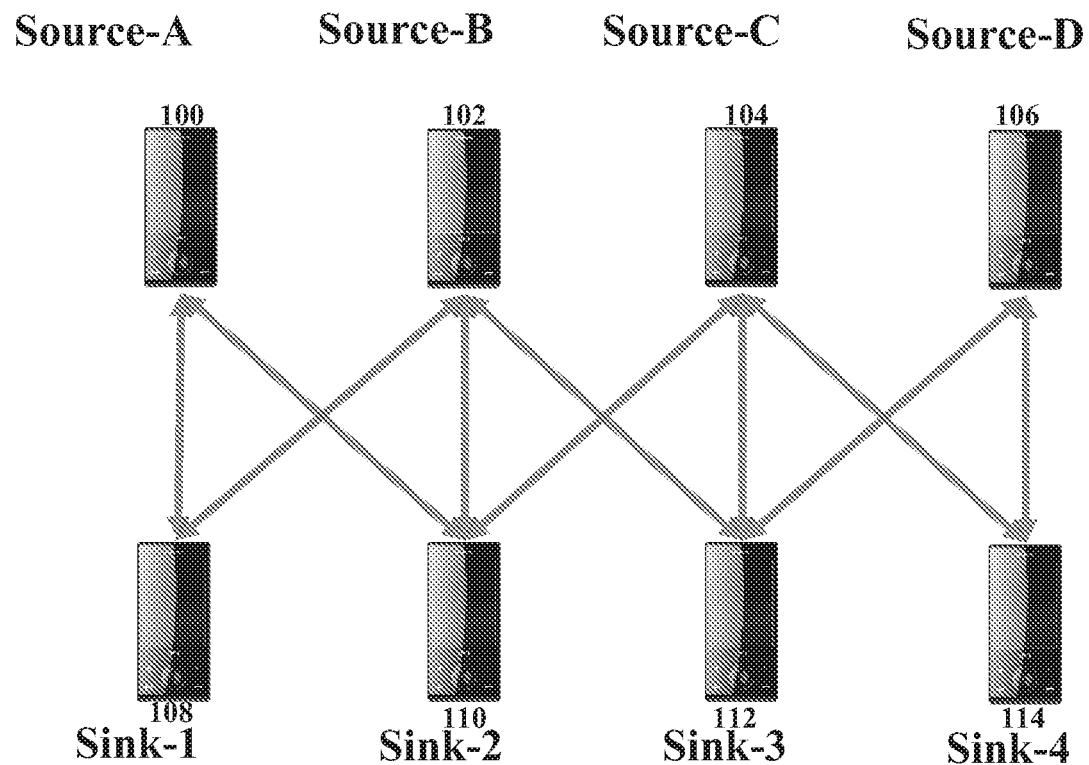
FIG. 1 illustrates a transmission request phase for a D2D communication scheme where each sink device can receive messages from a limited number of source devices.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can comprise one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, comprising a non-transitory computer readable storage medium.

In one example embodiment, described herein is a method for a priority-sequencing scheme can be achieved via a transmission request phase, a response phase, and a data transmission phase. The D2D communication can take place over two separate channels where one channel has a higher priority sequencing than the other.

According to another example embodiment, described herein is a system for facilitating signal data transmissions via a data channel. Signals can be sent from the source devices to the sink devices and other signals can be sent from the sink devices to the source devices.

Additionally, according to a further example embodiment, described herein is a system that can facilitate a priority-sequencing scheme via a transmission request phase, a response phase, a bandwidth request phase, and a resource allocation phase. The D2D communication allows each sink to hear every source using a two-channel priority-sequencing scheme.

In a conventional distributed resource allocation scheme, source devices can listen to a channel and if the channel is idle, the source device can transmit data or clear-to-send (CTS) messages via the channel. However, if there are multiple sources trying to transmit data, it can cause collisions and introduce additional latency.

Embodiments are described herein to provide a channel access protocol for distributed devices to content and access a two-dimensional resource efficiently within an orthogonal frequency-division multiple access (OFDMA)-based subframe for D2D devices. Mitigating collisions can provides high resource utilization, which can guarantee that at least one transmission can occur in a resource slot when the resource slot is contended by one or more devices with different sequences. In addition, to maximize the resource utilization and improve efficiencies, the described protocol can also support adaptive radio resource allocation to support usage cases of variable packet size.

User equipment (UEs) or source devices in centralized resource allocation networks, can send preambles as a transmission request to inform an evolved node b (eNB) or sink device that the UE wants to send out data, and the eNB can respond with a location for each UE to send out data in an uplink channel. However, in a D2D scenario, multiple sinks will respond to the transmission requests from the sources, possibly causing collisions due to multiple responses occurring. However, it is possible to provide a priority-sequencing scheme to mitigate possible collisions.

If the number of devices is large and the transmission packets are small, then many devices may contend for small amounts of resources of the small transmission packets. This can introduce significant overhead due to the contention procedure. In an OFDMA system, the unit of scheduling can be smaller to provide more flexibility. However, this can also introduce more signaling overhead. Consequently, a scheme to send transmission requests of multiple channels at the concurrently, can reduce the overhead. Besides, it reduces the collision of transmission request by the priority sequence so that the channel won't be idle due to the collision. In addition, for the group communication, the variable size of scheduling unit can be supported to further utilize the radio resource more efficiently.

For a group communication service, where each sink device can receive a message from all source devices, it requires an efficient resource allocation scheme to mitigate collisions between multiple source devices. In addition, to find the more efficient resource allocation globally, a joint resource allocation of multiple devices can be supported to allocate variable size of a scheduling unit.

A collision mitigation D2D scenario can comprise a transmission request phase with priority sequences, a response phase with multiple channels and a data transmission phase. The transmission request phase can have a corresponding transmission request channel. The response phase can have corresponding response channel. The data transmission phase can have a corresponding data transmission channel.

The probability of collision of multiple source devices can be mitigated and reduced by various priority sequences. During the transmission request phase, source devices can transmit priority sequences via the transmission request channel to contend for source units at the data channel. Each priority sequence can correspond to a set of resource units at the data channel. Sequences can have low cross-correlation properties comprising, but not limited to, orthogonal sequences, Zadoff-Chu sequences, etc.

$$\text{Linear property: } C(A)+C(B)=C(A+B) \qquad \text{Eqn. (1)}$$

$$\text{Decodable: } C(A+B)=>C(A)\& \ C(B) \qquad \text{Eqn. (2)}$$

$$\text{Priority property: } C(A)>C(B), C(C)>C(D) \qquad \text{Eqn. (3)}$$

$$\text{Priority property: } C(A)>C(B)>C(C) \qquad \text{Eqn. (4)}$$

For example: source devices A, B, and C can transmit C(A), C(B), and C(C) respectively, where C(A) can correspond to channel a, and C(B) can correspond to channel b. Although the sink devices can receive combinations of priority sequences as evidence by Eqn. (1), sink devices cannot know which source device sent the sequence. For example, a sink device cannot know that C(A) was sent from A.

In the response phase, the collision of response messages can be mitigated. The probability of collision of response messages from multiple sink devices can be reduced by various priority sequences. Sink devices can respond directly in the sequence, which they receive data from the source devices via a mapping table, eliminating the need to exchange of sink device identification information. Source devices can then receive the combination of the sequences from the sink devices. If the code is not the same as the source devices sent originally, the source devices can conclude that other devices exist and the source devices can decode the priority of sequences as evidenced in Eqn. (2).

During the data transmission phase the source devices can decode the response messages to determine the priority of other sequences. The source devices with the highest priority sequences can transmit data on their corresponding channels via the data channel. The identification of target sink devices can be transmitted via the data channel for unicast and multicast scenarios. For instance, after decoding, source device-A can conclude that two sequences, C(A) and C(B), are attempting to access channel a. Because the priority of C(A) is higher than the priority of C(B) (as evidenced by Eqn. (3)), source device-A can transmit the data on channel a.

The aforementioned process can mitigate collisions for D2D scenarios by providing high resource utilization, which can guarantee at least one collision-free transmission occurs in a set of resource units when various devices with different sequences are contending for resource units. In some cases, multiple devices may contend for the same data channel and leave other data channels empty. However, this can be resolved by two independent methods: 1) the source device can select multiple priority sequences, corresponding to different data channels, to contend for multiple data channel to further minimize waste; or 2) the source device can detect empty data or unused channels during the response phase and transmit data via the empty channels.

For the scenario where each sink device can receive messages from all source devices, the proposed scheme can comprise five phases to further provide joint resource allocation with a variable size scheduling unit: the transmission request phase with priority sequences, the response phase, the bandwidth request phase for multiple channels, the resource allocation phase, and the data transmission phase. The transmission request phase can correspond to a transmission request channel. The response phase can correspond to a response channel. The bandwidth request phase can correspond to a bandwidth request channel. The resource allocation phase can correspond to a resource allocation channel. The data transmission phase can correspond to a data transmission channel.

During the transmission request phase, source devices can transmit priority sequences via the Transmission Request Channel to contend for the bandwidth request channel. In this case, priority sequences cannot correspond to a set of resource units at the bandwidth request channel as in the previous scenario.

In the response phase, the collision of response messages can be mitigated. The probability of collision of response messages from multiple sink devices can be reduced by various priority sequences. Sink devices can respond directly in the sequence, which they receive data from the source devices via a mapping table, eliminating the need to exchange of sink device identification information. Source devices can then receive the combination of the sequences from the sink devices. If the code is not the same as the source devices sent originally, the source devices can conclude that other devices exist and the source devices can decode the priority of sequences as evidenced in Eqn. (2).

During the bandwidth request phase, source devices can decode all of the priority sequences in the response channel and transmit a bandwidth request message via the bandwidth request channel in order of priority. For example, if a source device selects the sequence with i-th priority in the response channel, the Source can transmit the bandwidth request message at the i-th bandwidth request channel. With different sequences, source devices do not contend for the same bandwidth request channel. The identification of target sink devices can be transmitted via bandwidth request channel for unicast and multicast scenarios. For example, after decoding, source device-A can conclude that there are three sequences, C(A), C(B) and C(C), which are attempting to access bandwidth request channels a and b. Because the priority of C(A) is highest, source device-A can transmit its bandwidth request (BW-A) via channel a. Similarly, C(B) has the second highest priority and therefore source device-B transmits its bandwidth request (BW-B) via channel b.

Finally, during the resource allocation phase, sink devices can send scheduling assignment data to source devices to allocate resource units according to the bandwidth request messages received during the bandwidth request phase. The resource scheduling can be performed by a scheduling algorithm comprising, but not limited to, round robin, deficit round robin, etc. The source device can then transmit data via the data channel according to the content of the scheduling assignment message.

As an overview of the various embodiments presented herein, to correct for the above-identified deficiencies and other drawbacks of conventional distributed resource allocation schemes, various embodiments are described herein to mitigate collisions between mobile devices and allocate variable size of radio resources. Described herein are systems, methods, articles of manufacture, and other embodiments or implementations that can facilitate D2D resource allocation based on a resource allocation scheme with priority sequencing.

These and other embodiments or implementations are described in more detail below with reference to the drawings.

Referring now to FIG. 1, illustrated is a transmission request phase for a D2D communication scheme where each sink device can receive messages from a limited number of source devices. For instance, Sink-1 108 can receive messages from source-A 100 and source-B 102. Sink-2 110 can receive messages from source-A 100, source-B 102, and source-C 106. Sink-3 112 can receive messages from source-B 102, source-C 104, and source-D 106. Sink-4 114 can receive messages from source-C 104 and source-D 106. Source-A 100, source-B 102, source-C 104, and source-D 106 can send priority sequences C(A), C(B), C(C), and C(D), respectively, where C(A) has a higher priority than C(B) (C(A)>C(B)), and C(C) has a higher priority than C(D) (C(C)>C(D)). There can be two channels, a and b, where channel a can correspond to the sequence C(A) and C(B) and channel b can correspond to the sequence C(C) and C(D). Sink-1 108, sink-2 110, sink-3 112, and sink-4 114 can receive combinations of the priority sequences C(A+B), C(A+B+C), C(B+C+D), C(C+D), respectively.

Figure 2:
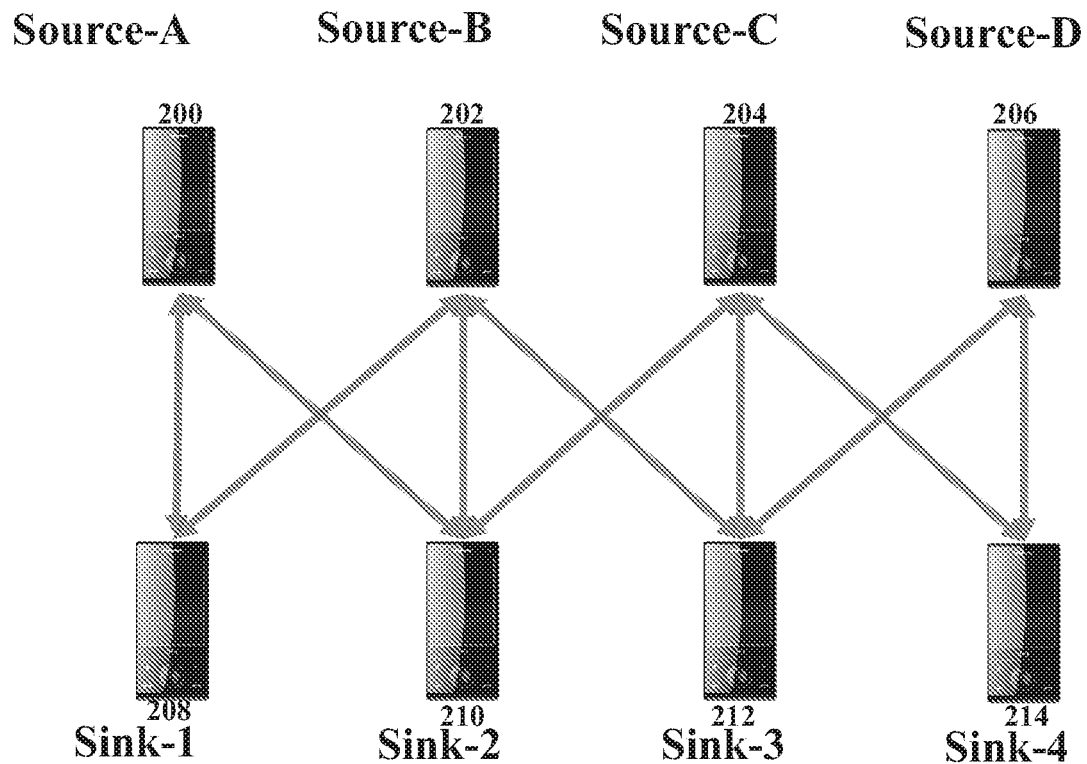
FIG. 2 illustrates a response phase for a D2D communication scheme where each sink device can receive messages from a limited number of source devices.

Referring now to FIG. 2, illustrated is a response phase for a D2D communication scheme where each sink device can receive messages from a limited number of source devices. In the response phase, the probability of collision of response messages from multiple sink devices can be reduced by various priority sequences. Sink devices can respond directly in the sequence, which they receive data from the source devices.

During the response phase, Sink-1 208, sink-2 210, sink-3 212, and sink-4 214 can send the combinations of the priority sequences C(A+B), C(A+B+C), C(B+C+D), C(C+D), respectively. Source-A 200 can receive C(A+B) from sink-1 208 and C(A+B+C) from sink-2 210. Using Eqn. (2) to decode the priority sequencing, source-A 200 can get C(A+B+C). Source-B 202 can receive C(A+B) from sink-1 208, C(A+B+C) from sink-2 210, and C(B+C+D) from sink-3 212. Using Eqn. (2) to decode the priority sequencing, source-B 202 can get C(A+B+C+D). Source-C 204 can receive C(A+B+C) from sink-2 210, C(B+C+D) from sink-3 212, and C(C+D) from sink-4 214. Using Eqn. (2) to decode the priority sequencing, source-C 206 can get C(A+B+C+D). Source-D 204 can receive C(B+C+D) from sink-3 212, and C(C+D) from sink-4 214. Using Eqn. (2) to decode the priority sequencing, source-D 208 can get C(B+C+D).

Figure 3:
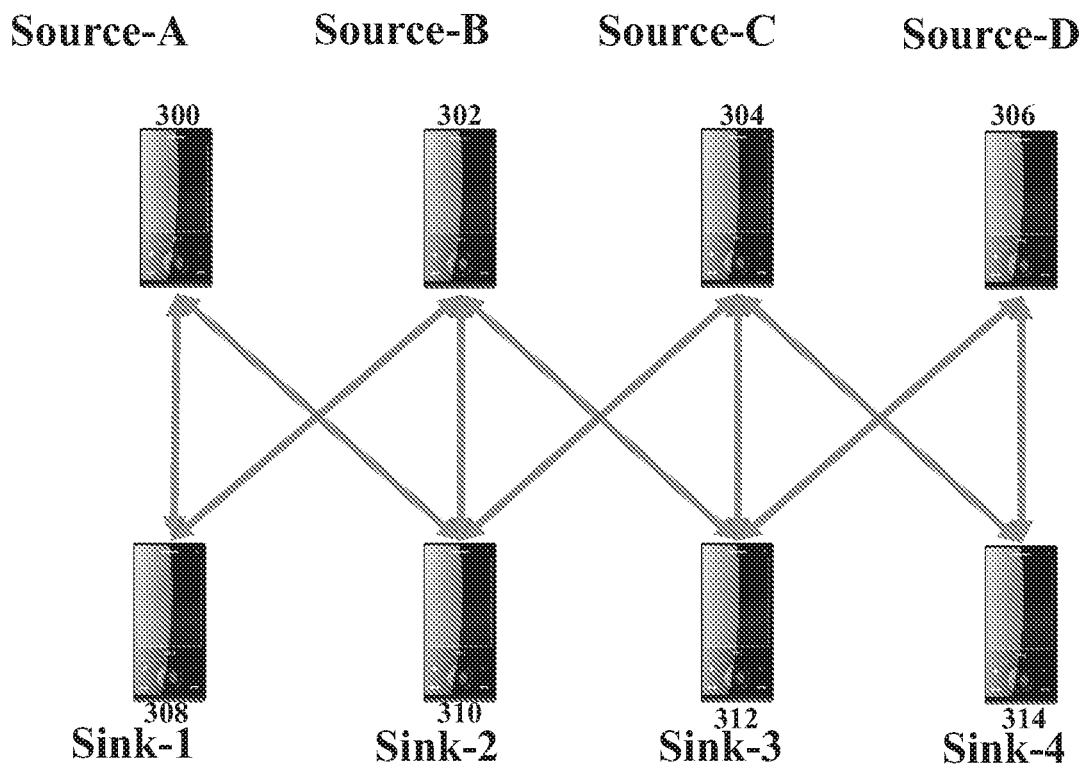
FIG. 3 illustrates a data transmission phase for a D2D communication scheme where each sink device can receive messages from a limited number of source devices.

Referring now to FIG. 3, illustrated is a data transmission phase for a D2D communication scheme where each sink device can receive messages from a limited number of source devices. The source devices can decode the response messages to determine the priority of other sequences during the data transmission phase. Consequently, the source devices with the highest priority sequences can transmit data on their corresponding channels via their data channel.

Source-A 300 can send data-A via channel a because C(A) has a higher sequence priority than C(B) as indicated by Eqn. 3. Therefore source-B 302 will be silent during the transmission of data-A because C(A) has a higher sequence priority than C(B). Source-C 304 can send data-C via channel b because C(C) has a higher sequence priority than C(D) as indicated by Eqn. 3. Therefore source-D 306 will be silent during the transmission of data-C because C(C) has a higher sequence priority than C(D). Therefore, the silencing of source-B 302 and source-D 306 can mitigate collisions for D2D scenarios by allowing source-A 300 and source-C 304 to utilized the corresponding channels. Consequently, sink-1 308 receives data from source-A 300, sink-2 310 receives data from source-A 300 and source-C 304, sink-3 312 receives data from source-C 304, and sink-4 314 receives data from source-C 304.

Figure 4:
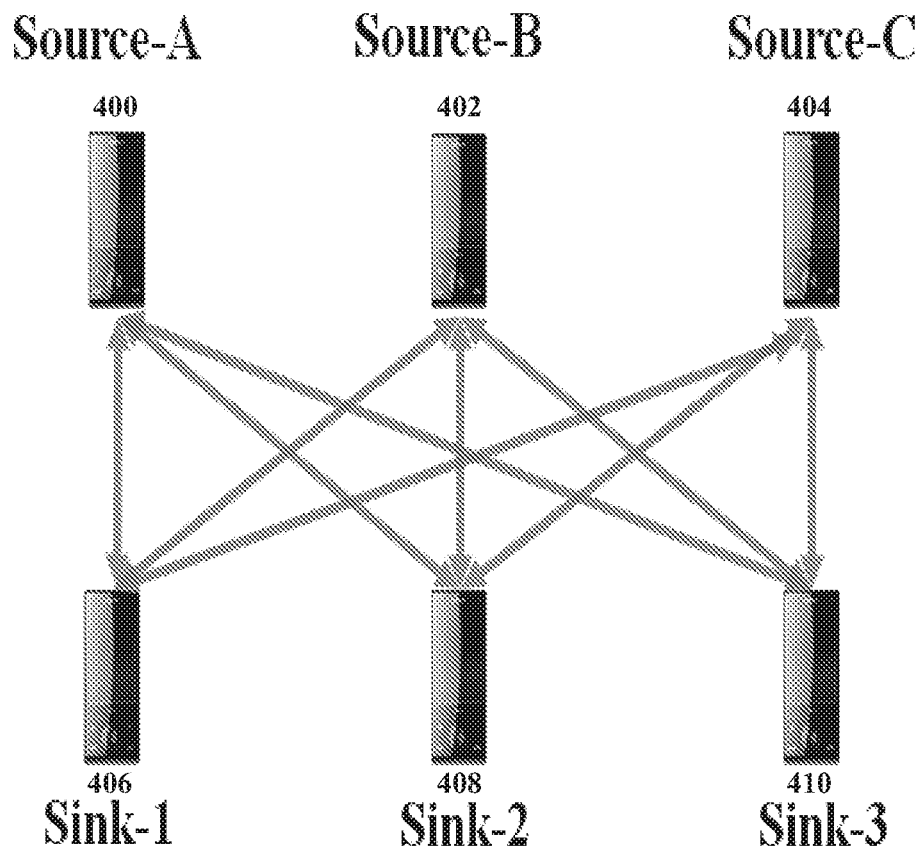
FIG. 4 illustrates a transmission request phase for a D2D communication scheme where each sink device can receive messages from all source devices.

Referring now to FIG. 4, illustrated is a transmission request phase for a D2D communication scheme where each sink device can receive messages from all source devices. For instance, Sink-1 406 can receive messages from source-A 400 source-B 402, and source-C 404. Sink-2 408 can receive messages from source-A 400, source-B 402, and source-C 406. Sink-3 410 can receive messages from source-A 400, source-B 402, and source-C 404. Source-A 400, source-B 402, and source-C 404 can send priority sequences C(A), C(B), and C(C), respectively, where C(A) has a higher priority than C(B) (C(A)>C(B)), and C(B) has a higher priority than C(C) (C(B)>C(C)). There can be two channels, a and b, where channel a can correspond to the sequence C(A) and channel b can correspond C(B). Sink-1 406, sink-2 408, and sink-3 410 can all receive combinations of the priority sequence C(A+B+C) because every sink device hears every source device.

Figure 5:
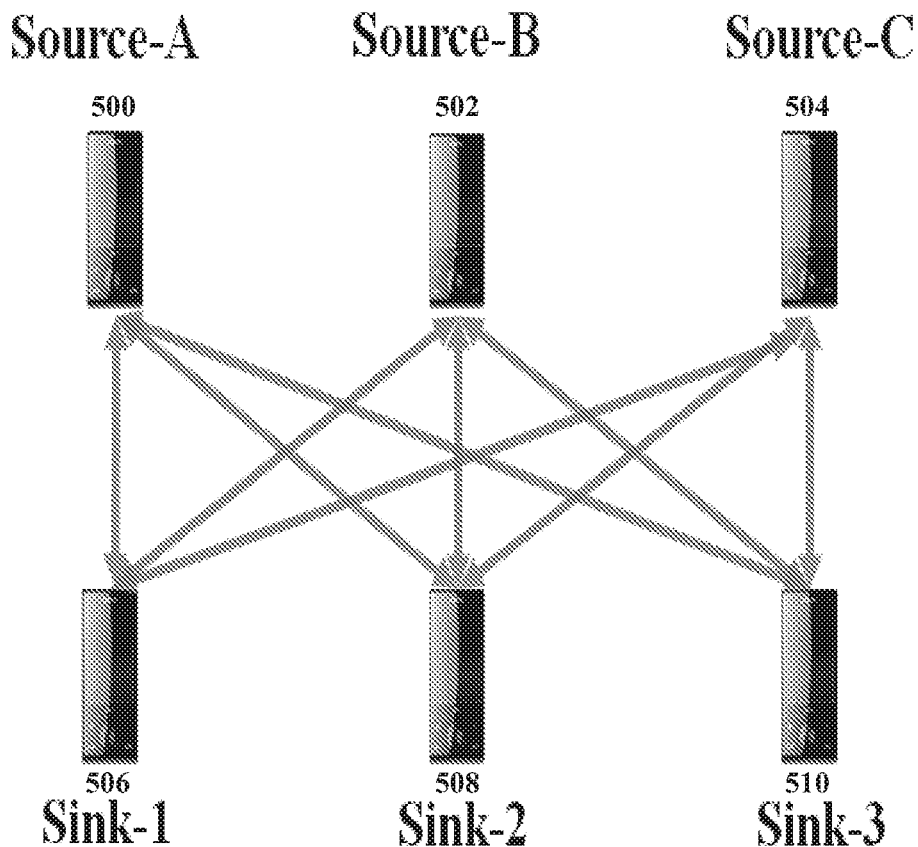
FIG. 5 illustrates a response phase for a D2D communication scheme where each sink device can receive messages from all source devices.

Referring now to FIG. 5, illustrated is a response phase for a D2D communication scheme where each sink device can receive messages from all source devices. In the response phase, sink devices can respond directly in the sequence, which they receive data from the source devices via a mapping table. Source devices can then receive the combination of the sequences from the sink devices.

During the response phase, Sink-1 506, sink-2 508, and sink-3 510 can send the combination of the priority sequence C(A+B+C). Source-A 500 can receive C(A+B+C) from sink-1 506, C(A+B+C) from sink-2 508, and C(A+B+C) from sink-3 510. Source-B 502 can receive C(A+B+C) from sink-1 506, C(A+B+C) from sink-2 508, and C(A+B+C) from sink-3 510. Source-C 504 can receive C(A+B+C) from sink-1 506, C(A+B+C) from sink-2 508, and C(A+B+C) from sink-3 510. Therefore, sink-1 506, sink-2 508, and sink-3 510 each send C(A+B+C) to source-A 500, source-B 502, and source-C 504.

Figure 6:
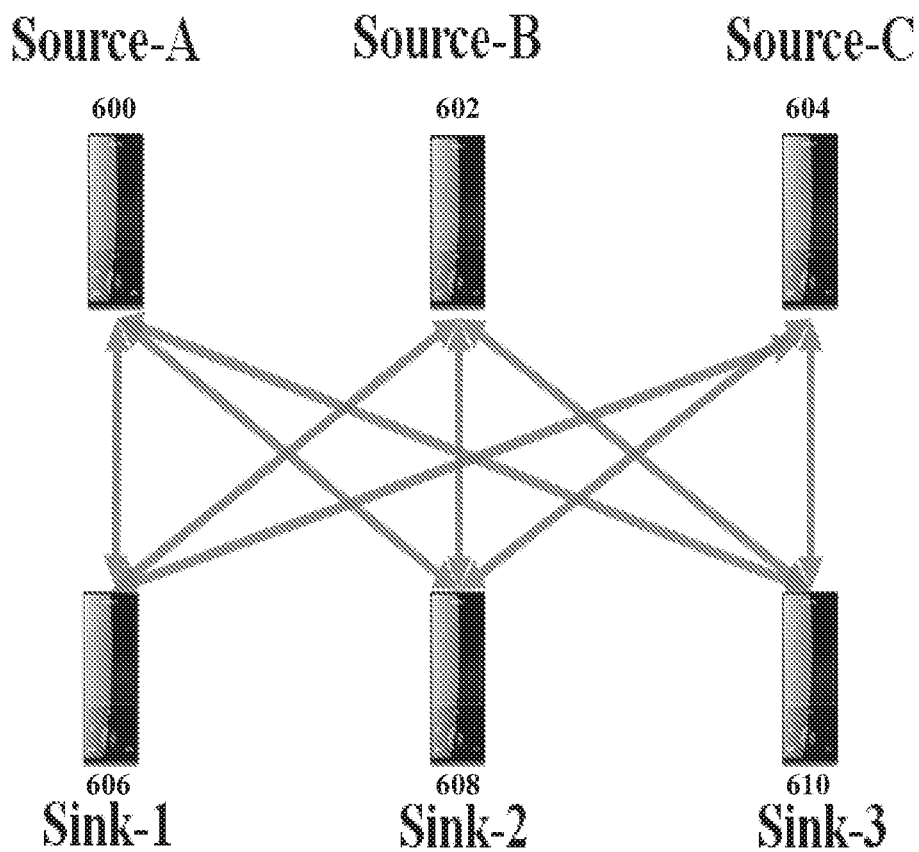
FIG. 6 illustrates a bandwidth request phase for a D2D communication scheme where each sink device can receive messages from all source devices.

Referring now to FIG. 6, illustrated is a bandwidth request phase for a D2D communication scheme where each sink device can receive messages from all source devices. During the bandwidth request phase, source devices can decode all of the priority sequences in the response channel and transmit a bandwidth request message so that the source devices do not contend for the same bandwidth request channel.

As shown by Eqn. (4) C(A) has a higher priority than C(B), and C(B) has a higher priority than C(D). However, there are only two channels (channel a and channel b) but there are three source devices. Because C(A) and C(B) are of a higher priority than C(C), source-A 600 and source-B 602 can use channel a and channel b to transmit bandwidth requests, respectively. Source-C 604 can be silent during this transmission process to mitigate the collision of messages. Because each sink device receives can receive requests from each source device, sink-1 606, sink-2 608, and sink-3 610 will receive bandwidth requests from source-A 600 and source-B 602.

Figure 7:
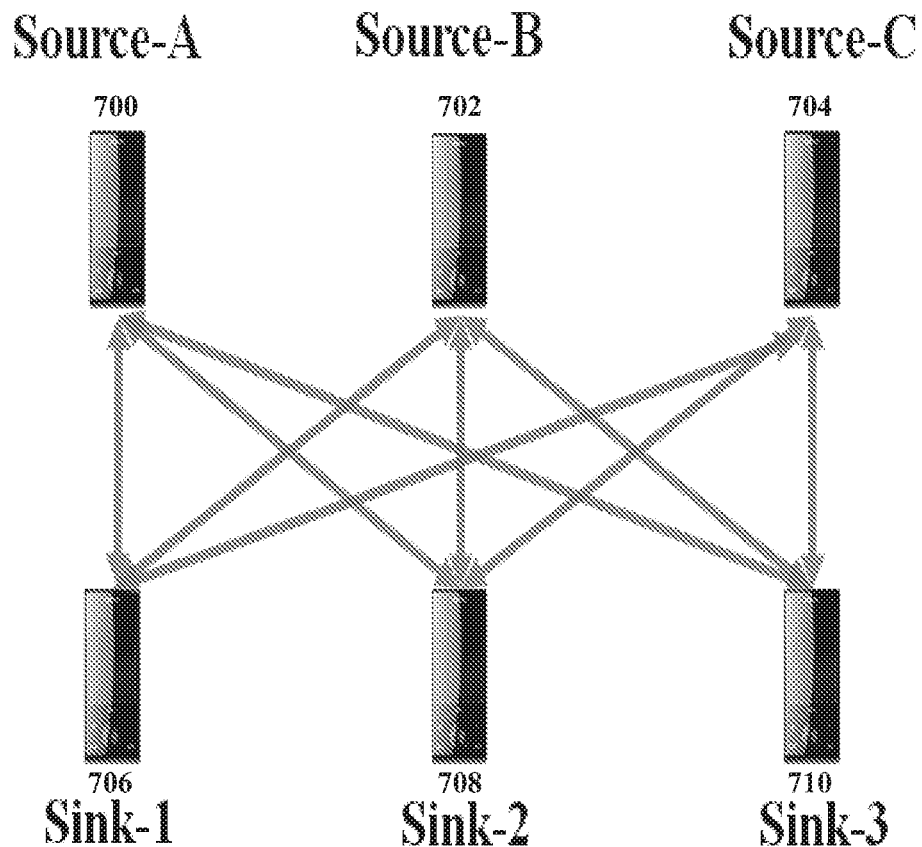
FIG. 7 illustrates a resource allocation phase for a D2D communication scheme where each sink device can receive messages from all source devices.

Referring now to FIG. 7, illustrated is a resource allocation phase for a D2D communication scheme where each sink device can receive messages from all source devices. During the resource allocation phase, sink devices can send scheduling assignment data to source devices to allocate resource units according to the bandwidth request messages received during the bandwidth request phase.

Based on the messages received during the bandwidth request phase, each sink-1 706, sink-2 708, and sink-3 710 can send scheduling assignment data to each of source-A 700, source-B 702, and source-C 704. The source devices can then transmit data via the data channel according to the content of the scheduling assignment messages from the sink devices.

Figure 8:
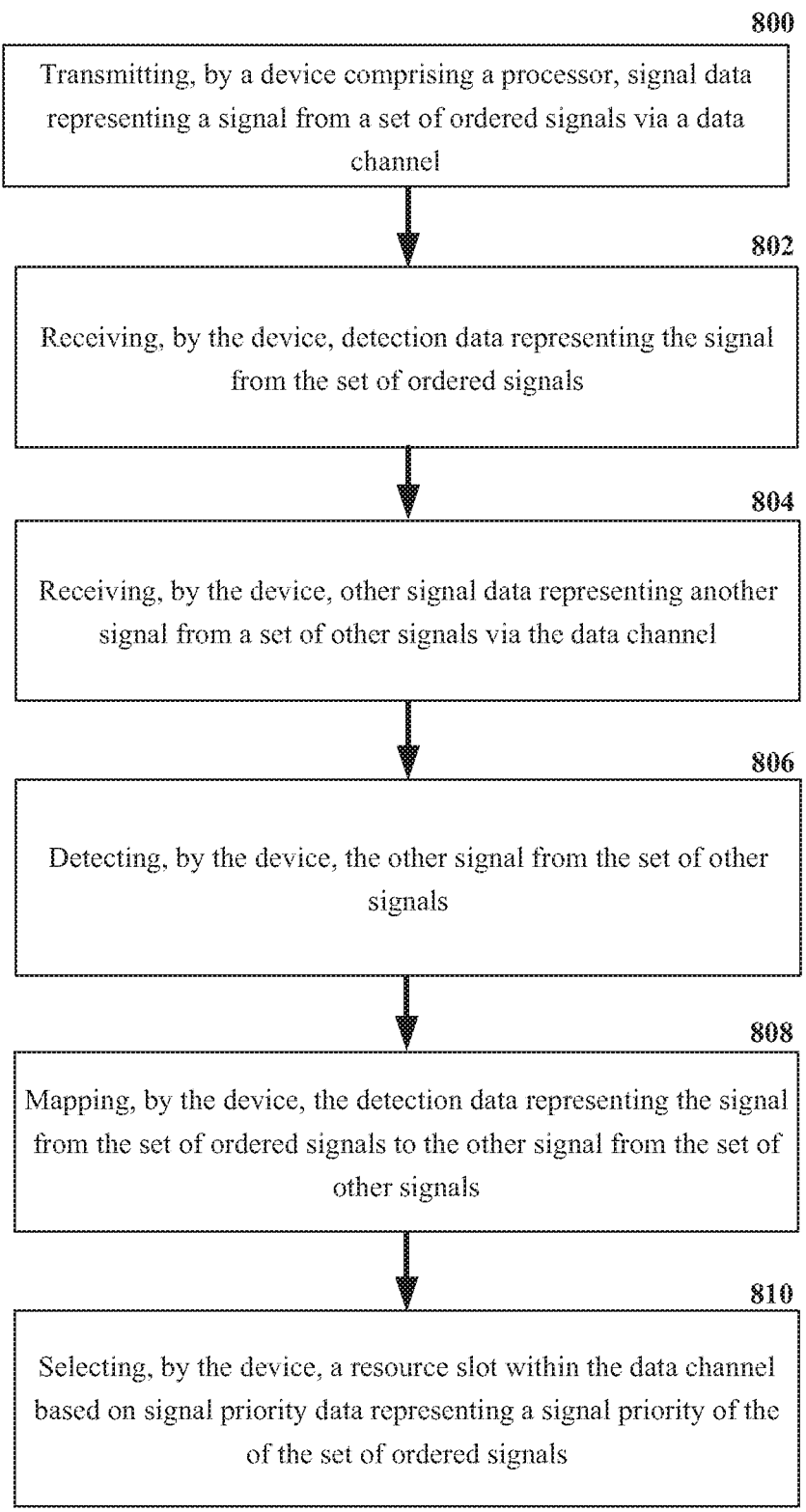
FIG. 8 illustrates a schematic system block diagram for transmitting and detecting signal data.

Referring now to FIG. 8, illustrated is a schematic system block diagram for transmitting and detecting signal data. At element 800 signal data representing a signal from a set of ordered signals can be transmitted via a data channel. Source devices can transmit message data to a limited number of sink devices. Detection data representing the signal from the set of ordered signals can be received at element 802. The message data received via the sink devices can culminate in detection data, which can then be transmitted back to the source devices. At element 804 other signal data representing another signal from a set of other signals via the data channel can be received. The source devices can then send message data to the sink devices based on a priority scheduling system. At element 806 the other signal from the set of other signals can be detected, and at element 808 the detection data representing the signal from the set of ordered signals to the other signal from the set of other signals can be mapped. Furthermore, a resource slot within the data channel based on signal priority data representing a signal priority of the of the set of ordered signals can be selected at element 810. Therefore, the sink devices can detect message data sent from the source devices in a specific order based on the priority scheduling system.

Figure 9:
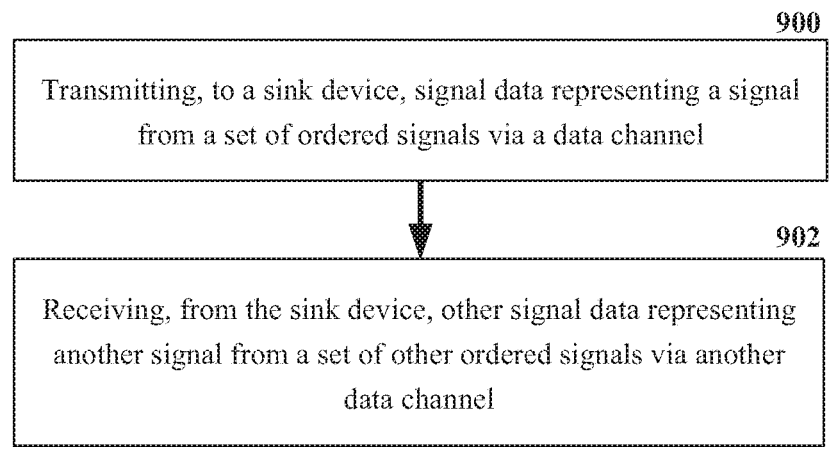
FIG. 9 illustrates a schematic system block diagram for facilitating transmitting signal data from a source device to a sink device.

Referring now to FIG. 9, illustrated is a schematic system block diagram for facilitating transmitting signal data from a source device to a sink device. At element 900 a transmission, from a source device to a sink device, of signal data representing a signal from ordered signals via a data channel can be facilitated. Source devices can transmit message data to a limited number of sink devices. The signal data representing the signal from the ordered signals can be received and detected at the sink device. The message data received via the sink devices can culminate in detection data, which can then be transmitted back to the source devices. Another transmission, from the sink device to the source device, of other signal data representing another signal from other signals can be received via another data channel at element 902. The source devices can then send message data to the sink devices based on a priority scheduling system. Other signal data, which was detected at the source device, representing the other signal from the other signals can also be received. Therefore, the sink devices can detect message data sent from the source devices in a specific order based on the priority scheduling system.

Figure 10:
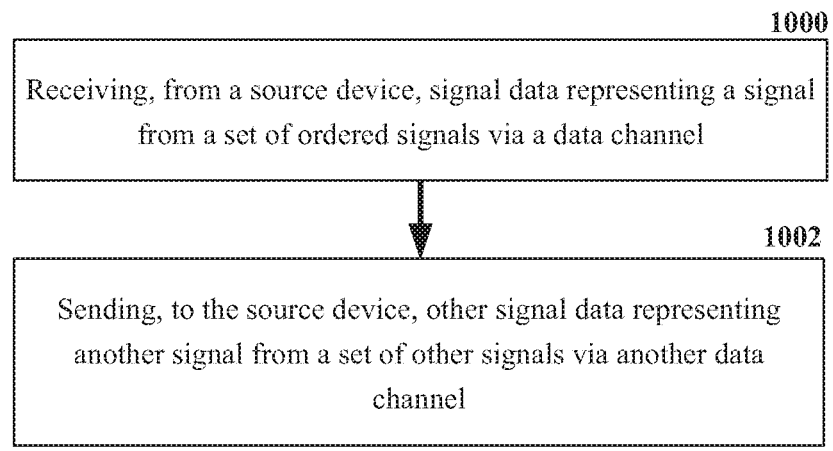
FIG. 10 illustrates a schematic system block diagram for receiving signal data at a sink device from a source device and sending other signal data from the sink device.

Referring now to FIG. 10, illustrated is a schematic system block diagram for receiving signal data at a sink device from a source device and sending other signal data from the sink device. This scenario allows all sink devices to receive messages from all source devices. Bandwidth request data, representative of a bandwidth request, in a bandwidth request channel can be transmitted. The source devices can transmit bandwidth request messages to the sink devices. The bandwidth request data transmitted can be received in a bandwidth request channel. Thus each sink device can receive signal data representing a signal from a set of ordered signals via a data channel at element 1000. At element 1002 the sink can send to the source device other signal data representing another signal from a set of other signals via another data channel. Bandwidth request data in the bandwidth request channel can be decoded, resulting in decoded data. During the bandwidth request phase, source devices can decode all of the priority sequences in the response channel and transmit a bandwidth request message so that the source devices do not contend for the same bandwidth request channel. A resource allocation for a data channel can be scheduled based on the decoded data. The resource allocation can be based on a sequence priority. Scheduling assignment data, representative of a scheduling assignment, can be transmitted in a scheduling assignment channel based on the resource allocation, and data can be transmitted via the data channel based on the scheduling assignment data. Therefore priority sequencing and scheduling assignments can allow data to be transmitted while mitigating source collisions.

Figure 11:
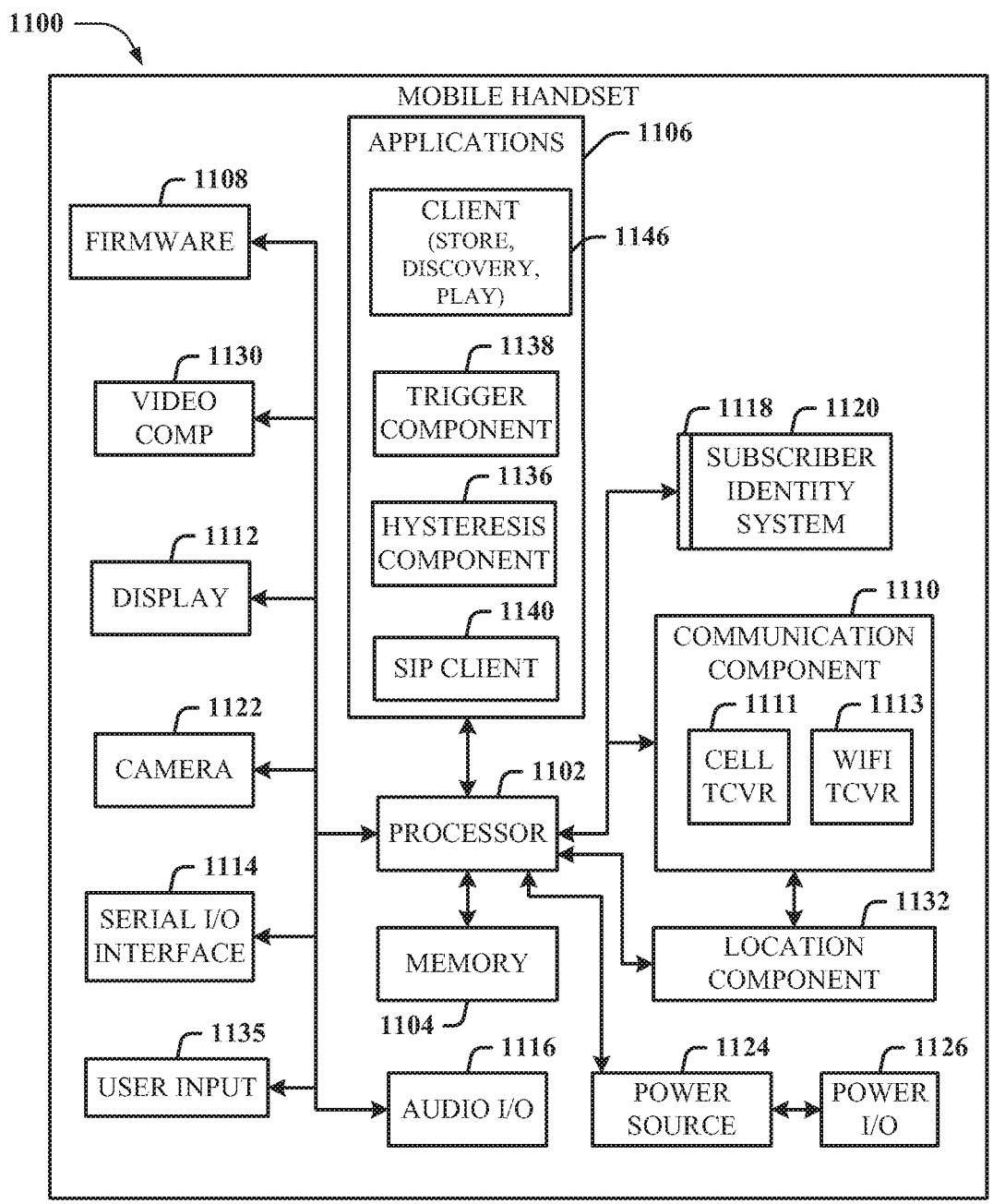
FIG. 11 illustrates a block diagram of an example mobile handset operable to engage in a system architecture that facilitates secure wireless communication according to the embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the innovation described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., WiFi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
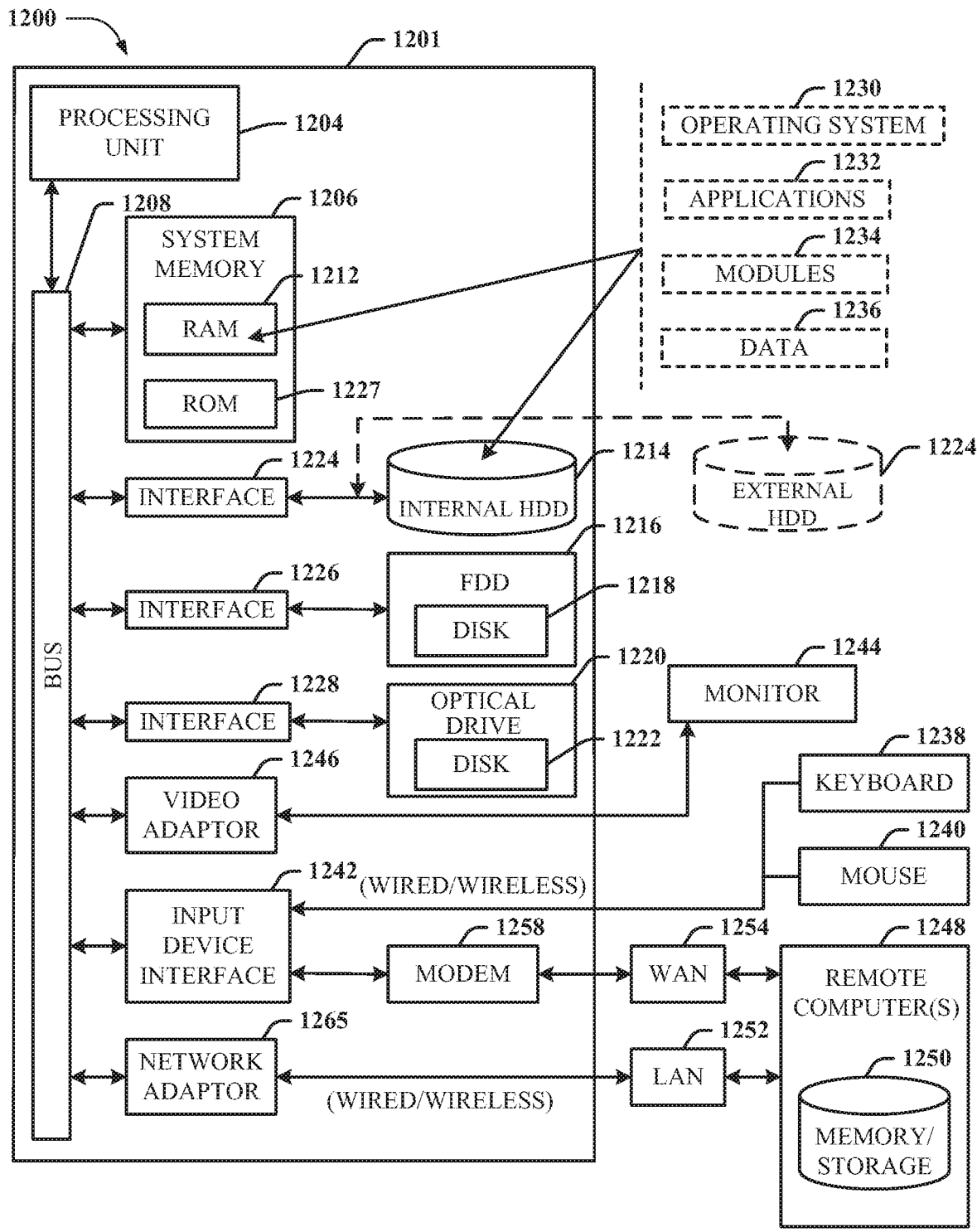
FIG. 12 illustrates a block diagram of an example computer operable to engage in a system architecture that facilitates secure wireless communication according to the embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, handheld computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method for device-to-device communication frameworks comprising:
before receiving a first, second, and third data packet from a first, second, and third source device, respectively, receiving, by a sink device, a first transmission request directly from the first source device, wherein the first transmission request includes a first priority sequence for the first source device;
receiving, by the sink device, a second transmission request directly from the second source device, wherein the second transmission request includes a second priority sequence for the second source device;
receiving, by the sink device, a third transmission request directly from the third source device, wherein the third transmission request includes a third priority sequence for the third source device, wherein the first priority sequence and the second priority sequence correspond with a first channel and the third priority sequence corresponds with a second channel;
sending, by the sink device, a response message to the first source device, the second source device, and the third source device, wherein the response message combines the first priority sequence, the second priority sequence, and the third priority sequence, and further wherein the response message is decodable by the first source device and the second source device for determining a data transmission priority between the first priority sequence and the second priority sequence;
receiving, by the sink device, the first data packet from the first source device via the first channel on condition that a priority of the first priority sequence is higher than a priority of the second priority sequence; and
receiving, by the sink device, the third data packet from the third source device via the second channel.

2. The method of claim 1, wherein the sending of the response message is sent to the first source device and the second source device based on a sequence in which the first transmission request and the second transmission request were received by the sink device from the first source device and the second source device, respectively.

3. The method of claim 2, wherein the sequence is based on a mapping table.

4. The method of claim 1, wherein the response message does not include sink device identification information.

5. The method of claim 1, further comprising:
after the sending of the response message, receiving, by the sink device, a first bandwidth request message directly from the first source device via the first channel based on the data transmission priority; and
receiving, by the sink device, a second bandwidth request message directly from the second source device via the second channel on condition that the priority of the second priority sequence is higher than a priority of the third priority sequence.

6. The method of claim 5, further comprising sending, by the sink device, scheduling assignment data to the first source device and the second source device based on the first bandwidth request message and the second bandwidth request message.

7. The method of claim 6, further comprising receiving, by the sink device, the first data packet from the first source device and the second data packet from the second source device based on the scheduling assignment data.

8. The method of claim 5, wherein the first channel has higher priority sequencing than the second channel.

9. The method of claim 1, wherein the receiving and the sending is performed within an orthogonal frequency-division multiple access (OFDMA)-based sub-frame.

10. A method for device-to-device communication frameworks comprising:
sending, by a first source device, a transmission request message directly to at least one sink device via a transmission request channel, wherein the first source device contends for a first data transmission channel and the transmission request message includes a first priority sequence for the first source device;
receiving, by the first source device, a response message directly from the at least one sink device via a response channel, wherein the response message includes a combination of priority sequences from the at least one sink device, wherein the combination of priority sequences includes the first priority sequence for the first source device, a second priority sequence for a second source device contending for the first data transmission channel, and a third priority sequence for a third source device contending for a second data transmission channel;
decoding, by the first source device, the combination of priority sequences from the at least one sink device to determine a priority of the first priority sequence relative to a priority of the second priority sequence; and
after the decoding of the combination of priority sequences, transmitting, by the first source device, data directly to the at least one sink device via the first data transmission channel based on the priority of the first priority sequence for the first source device relative to the priority of the second priority sequence of the second source device.

11. The method of claim 10, wherein the at least one sink device includes a subset of a plurality of sink devices.

12. The method of claim 10, wherein the at least one sink device includes all of a plurality of sink devices.

13. The method of claim 10, wherein:
the at least one sink device includes a first sink device and a second sink device;
the receiving includes receiving, by the first source device, a first response message directly from the first sink device and a second response message directly from the second sink device, wherein the first response message includes a first combination of priority sequences and the second response message includes a second combination of priority sequences, wherein the first combination of priority sequences is different than the second combination of priority sequences; and
the decoding includes decoding the first combination of priority sequences and the second combination of priority sequences.

14. The method of claim 10,
wherein a priority of the first data transmission channel is higher than a priority of the second data transmission channel;
the transmitting includes, when the priority of the first priority sequence of the first source device is higher than the priority of the second priority sequence of the second source device, selecting, by the first source device, the first data transmission channel for transmitting the data; and
the transmitting includes, when the priority of the first priority sequence of the first source device is lower than the priority of the second priority sequence of the second source device, selecting, by the first source device, the second data transmission channel for transmitting the data.

15. The method of claim 10, further comprising:
transmitting, by the first source device, a bandwidth request message directly to the at least one sink device via a bandwidth request channel; and
receiving, by the first source device, scheduling assignment data directly from the at least one sink device in response to the bandwidth request message, wherein the transmitting the data directly to the at least one sink device is further based on the scheduling assignment data.

16. The method of claim 10, wherein the first source device does not receive any sink identification information from the at least one sink device.

17. The method of claim 10, wherein the sending and the receiving is performed within an orthogonal frequency-division multiple access (OFDMA)-based sub-frame.

18. A method for device-to-device communication frameworks that includes implementing a two-channel priority sequencing scheme, such that a sink device receives data from source devices via a first channel and a second channel, the method comprising:
before receiving first, second, and third data from a first, second, and third source device, respectively, receiving, by the sink device, a first transmission request message directly from the first source device, a second transmission request message directly from the second source device, and a third transmission request message directly from the third source device, wherein the first transmission request message includes a first priority sequence, the second transmission request message includes a second priority sequence, and the third transmission request message includes a third priority sequence, wherein both the first priority sequence and the second priority sequence correspond with the first channel and the third priority sequence corresponds with the second channel;
sending, by the sink device, a response message directly to the first source device, the second source device, and the third source device, wherein the response message includes a combination of the first priority sequence, the second priority sequence, and the third priority sequence;
receiving, by the sink device, first data directly from the first source device or second data directly from the second source device, wherein the first data and the second data are received on the first channel based on a priority of the first priority sequence relative to a priority of the second priority sequence; and
receiving, by the sink device, third data directly from the third source device via the second channel.

19. The method of claim 18, wherein receipt of the first data and the second data is sequenced based on the priority of the first priority sequence relative to the priority of the second priority sequence.

20. The method of claim 18, wherein on condition that the priority of the first priority sequence is lower than the priority of the second priority sequence, the sink device receives second data directly from the second source device via the first channel.

* * * * *